United States Patent
Morimoto et al.

(10) Patent No.: US 12,342,742 B2
(45) Date of Patent: Jul. 1, 2025

(54) AUTOMATIC TRAVEL SYSTEM AND AUTOMATIC TRAVEL METHOD

(71) Applicant: KUBOTA CORPORATION, Osaka (JP)

(72) Inventors: Takanori Morimoto, Sakai (JP); Kotaro Yamaguchi, Amagasaki (JP); Fumiya Yoshimura, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 120 days.

(21) Appl. No.: 18/270,247

(22) PCT Filed: Dec. 6, 2021

(86) PCT No.: PCT/JP2021/044753
§ 371 (c)(1),
(2) Date: Jun. 29, 2023

(87) PCT Pub. No.: WO2022/149389
PCT Pub. Date: Jul. 14, 2022

(65) Prior Publication Data
US 2024/0099176 A1 Mar. 28, 2024

(30) Foreign Application Priority Data
Jan. 5, 2021 (JP) .................................. 2021-000348

(51) Int. Cl.
*A01B 69/04* (2006.01)
(52) U.S. Cl.
CPC .................. *A01B 69/008* (2013.01)
(58) Field of Classification Search
None
See application file for complete search history.

(56) References Cited

U.S. PATENT DOCUMENTS

| 2014/0081568 A1* | 3/2014 | Pieper .................. G05D 1/0219 701/400 |
| 2017/0102702 A1 | 4/2017 | Ishijima et al. |

(Continued)

FOREIGN PATENT DOCUMENTS

| JP | 2018-185671 A | 11/2018 |
| JP | 2020110158 A | 7/2020 |
| WO | 2016/002246 A1 | 1/2016 |

OTHER PUBLICATIONS

Official Communication issued in corresponding European Patent Application No. 21917610.4, mailed on Sep. 2, 2024, 8 pages.

(Continued)

*Primary Examiner* — Tamara L Weber
(74) *Attorney, Agent, or Firm* — Keating & Bennett, LLP

(57) ABSTRACT

An automatic travel system includes a prohibition boundary line setter to set a prohibition boundary line beyond which the vehicle is prohibited from entering, a turning circle setter to set a virtual turning circle as a target route for entry turning travel to enter a subsequent travel route, a transition turning travel controller to control tangent following travel using a vehicle body reference point that is calculated during travel to the virtual turning circle as a target orientation, and the entry turning travel using the virtual turning circle as a turning target route, an interference boundary line detector to detect the prohibition boundary line that is present in a moving direction of the vehicle in the tangent following travel, as an interference boundary line, and an interference avoidance travel controller to control travel for avoiding interference with the interference boundary line.

7 Claims, 11 Drawing Sheets

(56) References Cited

U.S. PATENT DOCUMENTS

2018/0310461 A1   11/2018  Shinkai et al.
2024/0045430 A1*  2/2024  Kudo .................... A01B 69/008
2024/0077876 A1*  3/2024  Iwase ................... G05D 1/0219

OTHER PUBLICATIONS

Official Communication issued in International Patent Application No. PCT/JP2021/044753, mailed on Jan. 25, 2022.

* cited by examiner

Fig.12
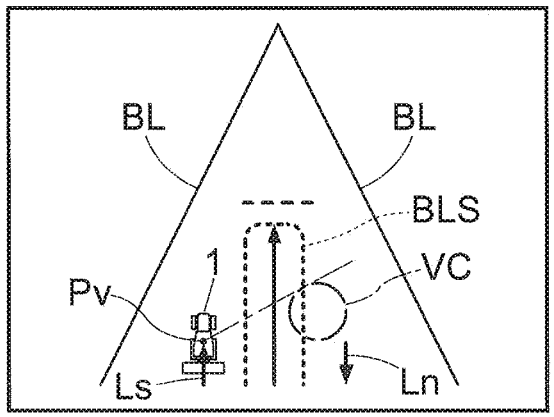
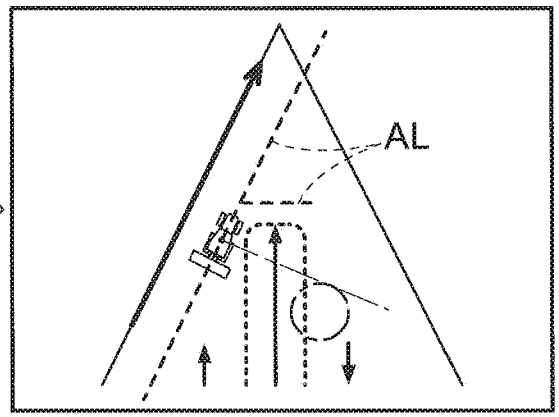
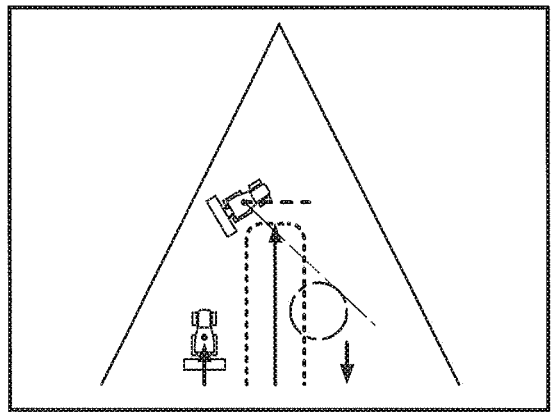
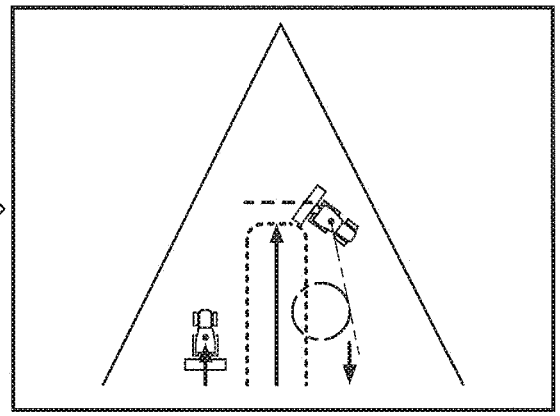
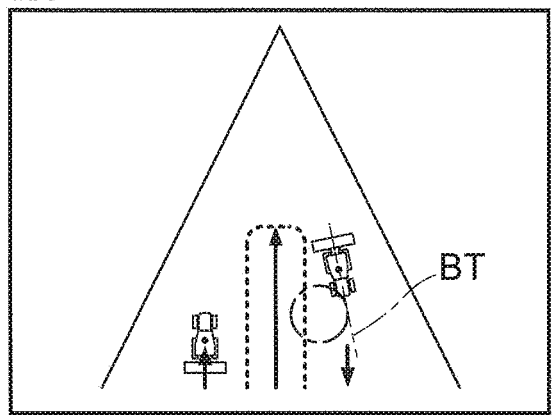
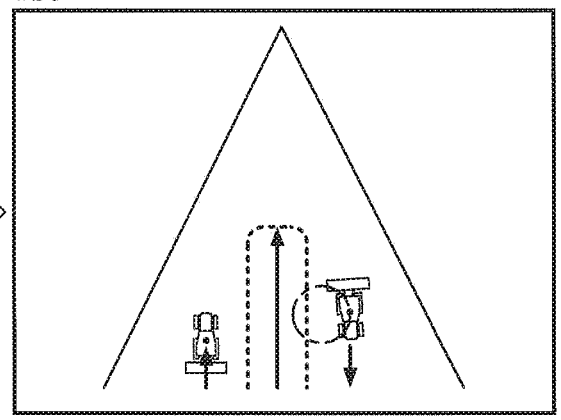

AUTOMATIC TRAVEL SYSTEM AND AUTOMATIC TRAVEL METHOD

BACKGROUND OF THE INVENTION

1. Field of the Invention

The present invention relates to an automatic travel system and an automatic travel method for a vehicle that moves from a previous travel route to a subsequent travel route via turning travel.

2. Description of the Related Art

JP 2018-185671A discloses an automatic steering system for a vehicle having an own-vehicle position detection function that moves from a previous travel route to a subsequent travel route via turning travel. The automatic steering system includes a first steering control unit for performing steering control for first turning travel for leaving a previous travel route for a subsequent travel route, a second steering control unit for performing steering control for second turning travel for entering the subsequent travel route, a third steering control unit for performing steering control for transition travel between the first turning travel and the second turning travel, a virtual turning circle calculation unit for calculating a virtual turning circle for use as a target route for the second turning travel, and a tangent calculation unit for calculating, as a target route for the transition travel, a tangent to the virtual turning circle from a vehicle body reference point during the first turning travel. Furthermore, if the angle between the calculated tangent and a travel orientation of the vehicle is within a first predetermined angle, the tangent calculation unit defines the tangent as a reference tangent, and the third steering control unit performs the steering control using the reference tangent as the target route for the transition travel.

In this configuration, the transition travel from the first turning travel to the second turning travel is straight forward travel using the tangent to the virtual turning circle from the vehicle body reference point in the first turning travel as the target route, and when the travel along the tangent is complete, turning control is possible for realizing smooth entry into the subsequent travel route using the virtual turning circle as a target route.

SUMMARY OF THE INVENTION

However, in the automatic steering system disclosed in JP 2018-185671A, a smooth transition from the previous travel route to the subsequent travel route is realized without any difficulty, when a sufficient space is ensured for a transition from the previous travel route to the subsequent travel route via turning travel. However, if any boundary line such as a ridge or pale is included in the transition route, automatic travel will be disabled.

In view of such circumstances, preferred embodiments of the present invention provide an automatic travel system and an automatic travel method that, even if any prohibition boundary line beyond which a vehicle is prohibited from entering protrudes into a transition route from a previous travel route to a subsequent travel route, enables a transition to the subsequent travel route with as little interruption of automatic steering as possible.

An automatic travel system according to a preferred embodiment of the present invention includes a prohibition boundary line setter to set a prohibition boundary line beyond which the vehicle is prohibited from entering, a turning circle setter to set a virtual turning circle as a target route for entry turning travel to enter the subsequent travel route, a tangent calculator to calculate a tangent to the virtual turning circle from a vehicle body reference point that is calculated during travel, a tangent following travel controller to control tangent following travel using an orientation of the tangent as a target orientation, a transition turning travel controller to, when an angle between a travel orientation of the vehicle and the tangent is within a predetermined angle in the tangent following travel, control the entry turning travel of the vehicle using the tangent as a transition target route and using the virtual turning circle as a turning target route, an interference boundary line detector to detect the prohibition boundary line that is present in a moving direction of the vehicle in the tangent following travel, as an interference boundary line, and an interference avoidance travel controller to control interference avoidance travel to avoid the vehicle from interfering with the interference boundary line.

In this configuration, if a prohibition boundary line beyond which the vehicle is prohibited from entering is present in the moving direction of the vehicle in the tangent following travel, the prohibition boundary line is regarded as an interference boundary line, and interference avoidance travel is performed to avoid the vehicle from interfering with the interference boundary line. That is to say, in the tangent following travel, if the tangent to the virtual turning circle from the vehicle body reference point (for example, the center of the vehicle body) intersects with the prohibition boundary line, travel following the tangent will interfere with the prohibition boundary line, and thus the interference avoidance travel for avoiding such an interference is executed. When such an interference with the prohibition boundary line is avoided by the interference avoidance travel, the vehicle can move to the subsequent travel route after the tangent following travel and the entry turning travel.

If a space for the vehicle to move from the previous travel route to the subsequent travel route via the turning travel is small, particularly, if the prohibition boundary line extends deep into the space between the end point of the previous travel route and the start point of the subsequent travel route, the vehicle will be situated at a dead end. In such a situation, the vehicle is required to turn to change the orientation of the vehicle body in a small space, and thus uses, for example, a direction change (referred to as a k-turn) using reversing or a pivot turn using a left-right speed difference, or the like. This turn has a short travel distance, and can be performed automatically by executing a predetermined control program. Thus, according to a preferred embodiment, the interference avoidance travel controller is configured or programmed to include a specific direction-change mode to execute space-saving turning travel using a k-turn or a turn with a left-right speed difference.

Particularly in the case of a farm or the like, the prohibition boundary line such as a ridge or a pale typically has a shape obtained by a combination of substantially straight lines. Accordingly, by traveling along the prohibition boundary line, which is regarded as an interference boundary line, at a distance from the prohibition boundary line for a while, the vehicle can reach a position at which the prohibition boundary line is not regarded as an interference boundary line. Thus, according to a preferred embodiment, the interference avoidance travel controller is configured or programmed to set, along the interference boundary line, an interference avoidance route that the vehicle can travel at a distance from the interference boundary line.

When the vehicle reaches the position at which the prohibition boundary line is not regarded as an interference boundary line, the tangent to the virtual turning circle from the vehicle body reference point no longer intersects with the prohibition boundary line, and thus tangent following travel based on this tangent can be performed. Thus, according to a preferred embodiment, upon completion of travel of the vehicle in the interference avoidance route controlled by the interference avoidance travel controller, automatic travel control for the vehicle is taken over by the tangent following travel controller. If there is any new prohibition boundary line in the tangent serving as the new transition travel route or in the direction of travel, a new interference avoidance route will be calculated and interference avoidance travel will be repeated. With this, the vehicle can eventually reach the virtual turning circle, and can enter the subsequent travel route.

When a vehicle equipped with this automatic travel system is a work vehicle that travels in a specific work field such as a farm field bordered by ridges, fixed walls or the like, a line of the boundary between the inside and the outside of the work field (outer shape line of the work field) serves as a prohibition boundary line beyond which the vehicle is not allowed to cross. Many farm field work vehicles that automatically travel have a function of first circling along the outer boundary or perimeter line of the work field to calculate a shape of a work field, that is, a prohibition boundary line. Thus, according to a preferred embodiment, the prohibition boundary line setter is operable to set an inside/outside boundary line of the work field, as the prohibition boundary line.

Depending on the work vehicle, it is desirable to avoid traveling into a worked region, which has already been worked. To satisfy the desire, it is preferable that the outer shape line of the worked region be regarded as a prohibition boundary line, and traveling into the worked region be prohibited. Thus, according to a preferred embodiment, the prohibition boundary line setter is operable to set a boundary line of at least a portion of a region that the work vehicle has not yet worked, as the prohibition boundary line.

Leaving turning travel, which is turning to leave the previous travel route serving as an origin, is to conform to the orientation of a tangent to the virtual turning circle from the vehicle body reference point, and thus it is preferable to use a minimum turning diameter to the extent that the roughness of the travel ground is tolerable. Also, when the angle between the tangent and the travel orientation of the vehicle decreases to some extent, switching from the turning travel to the tangent following travel can reduce or prevent control hunting, making it possible to realize smooth travel. Thus, according to a preferred embodiment, leaving turning travel to leave the previous travel route is performed at a preset steering angle, and the tangent following travel controlled by the tangent following travel controller is performed during the leaving turning travel.

The subject matter of preferred embodiments of the present invention includes not only the automatic travel system but also an automatic travel method for a vehicle that moves from a previous travel route to a subsequent travel route via turning travel. Such an automatic travel method includes setting a prohibition boundary line beyond which the vehicle is prohibited from entering, setting a virtual turning circle as a target route for entry turning travel for entering the subsequent travel route, calculating a tangent to the virtual turning circle from a vehicle body reference point that is calculated during travel, controlling tangent following travel using an orientation of the tangent as a target orientation, when an angle between a travel orientation of the vehicle and the tangent is within a predetermined angle in the tangent following travel, controlling the entry turning travel of the vehicle using the tangent as a transition target route, detecting the prohibition boundary line that is present in a moving direction of the vehicle in the tangent following travel, as an interference boundary line, and controlling interference avoidance travel to avoid the vehicle from interfering with the interference boundary line. This automatic travel method also has the above-described functions and effects of the automatic travel system, and the above-described preferred embodiments are also applicable to the automatic travel method.

Moreover, the subject matter of preferred embodiments of the present invention includes a vehicle using the above-described automatic travel system and an automatic travel method, programming or making a computer program for the above-described automatic travel method, and a non-transitory computer-readable medium in which the program is stored.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 schematically illustrates movement of the tractor in another example of the turning travel using the interference avoidance route.

DETAILED DESCRIPTION OF THE PREFERRED EMBODIMENTS

Figure 1:
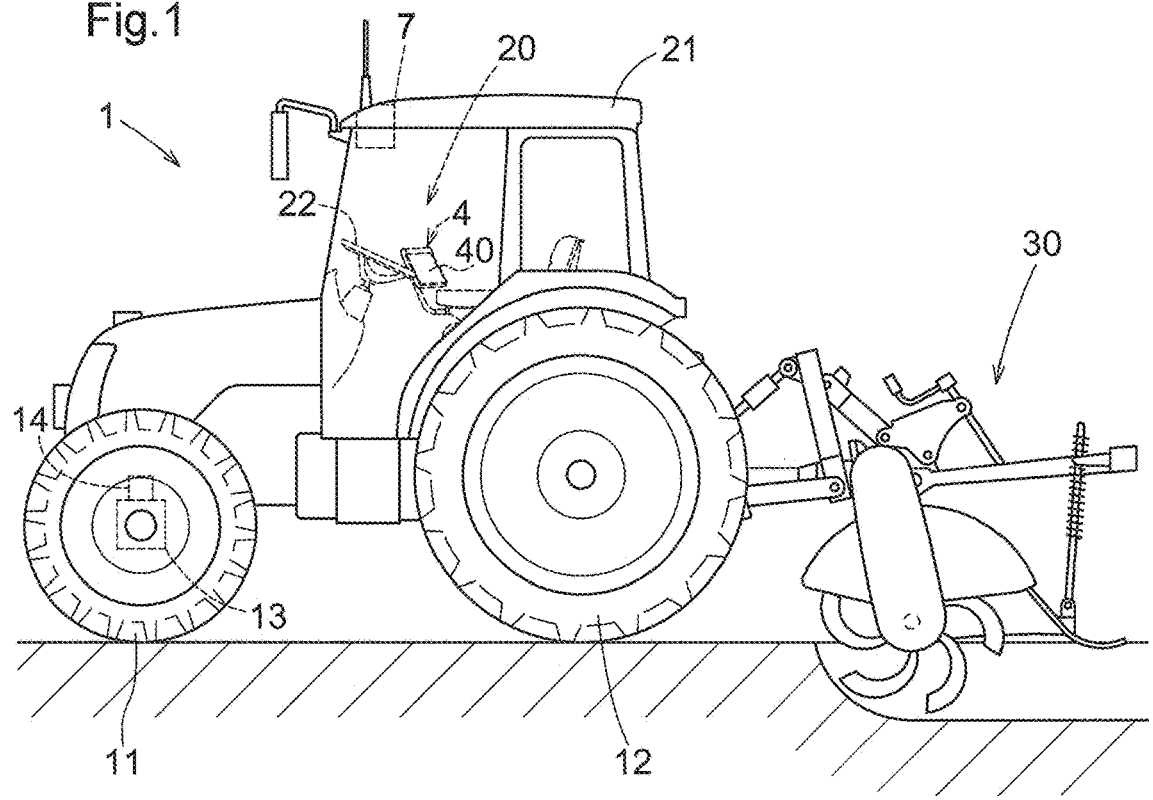
FIG. 1 is a side view illustrating a tractor equipped with an automatic travel system.

The following will describe preferred embodiments of the automatic travel system according to the present invention with reference to the drawings. FIG. 1 is a side view illustrating a tractor that serves as an example of a work vehicle equipped with such an automatic travel system. As shown in FIG. 1, the tractor travels in a farm field, which serves as a work field, while performing ground work. The tractor includes a driver's room 20 in a central portion of a vehicle body 1 supported by front wheels 11 and rear wheels 12. A rotary cultivator 30, which is a work device, is provided behind the vehicle body 1 via a hydraulic lifting mechanism. The front wheels 11 function as steering control wheels, and the travel direction of the tractor is changed by changing the steering angle of the front wheels 11. The steering angle of the front wheels 11 is changed by an operation of a steering mechanism 13. The steering mechanism 13 includes a steering motor 14 for automatic steering. During manual travel, the front wheels 11 are steered by an operation of a steering wheel 22 provided in the driver's room 20. The tractor includes a satellite positioning module 7, serving as a positioning module, in a cabin 21 of the tractor in order to realize an own-vehicle position detection function. As a component of the satellite positioning module 7, a satellite antenna to receive a GNSS (global navigation satellite system) signal (including a GPS signal) is attached to a ceiling region of the cabin 21. Note that an inertial navigation module including a gyro acceleration sensor or a magnetic orientation sensor may also be provided in the satellite positioning module 7, in order to complement satellite navigation. Of course, the inertial navigation module may also be provided at a place other than the satellite positioning module 7. In this preferred embodiment, a general-purpose data processing terminal 4 is provided in the driver's room 20. The data processing terminal 4 is a tablet-type computer with a touch panel 40, and is capable of accepting various types of operation inputs from a driver and notifying the driver of various types of information.

Figure 2:
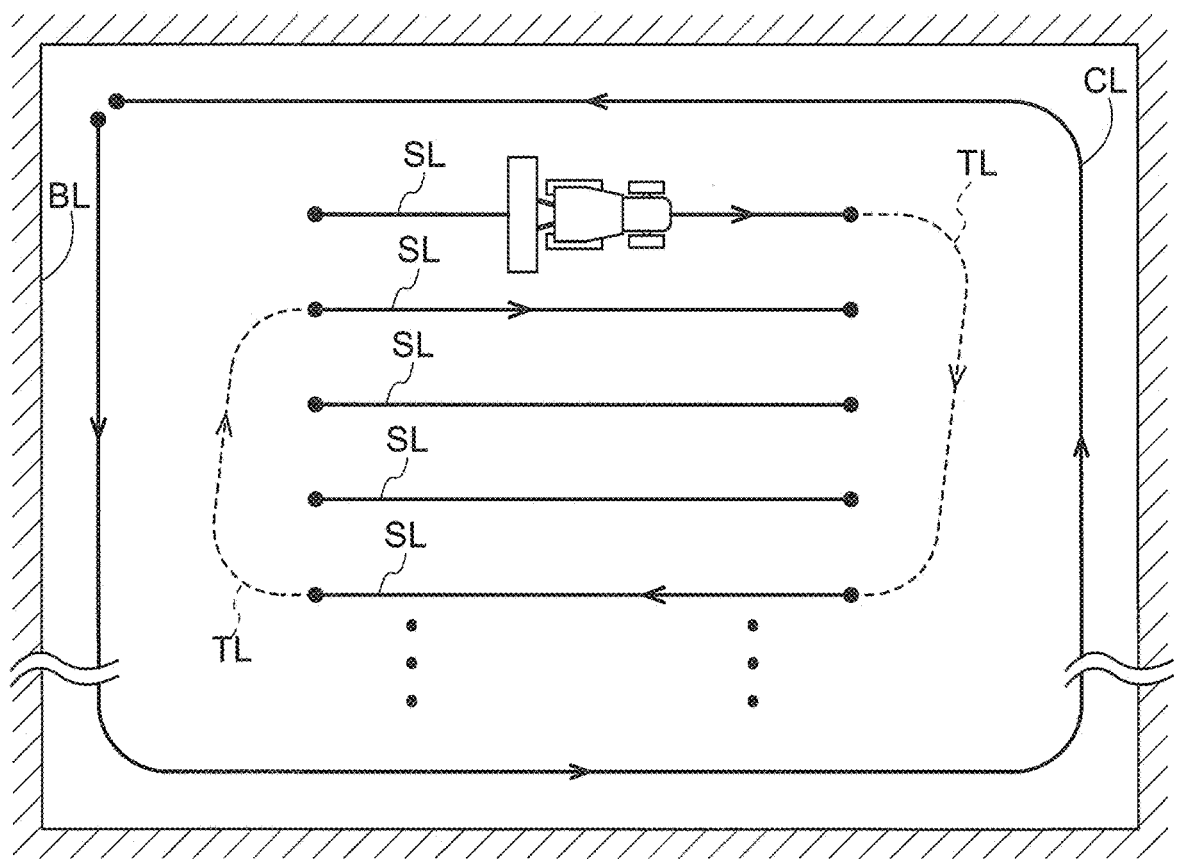
FIG. 2 is a diagram schematically illustrating a portion of a travel route that the tractor automatically travels.

FIG. 2 schematically shows a simplified example of work travel of the tractor that travels and works in a farm field. The farm field is surrounded by a ridge, and thus an inner boundary line (inside/outside boundary line) of the ridge functions as a prohibition boundary line BL beyond which the tractor is prohibited from entering. The prohibition boundary line BL, which is the inner boundary line of the ridge, can be obtained based on a travel path that has traveled by the tractor when it circles along the inner boundary line of the ridge, the travel path being acquired based on an own-vehicle position calculated from positioning data acquired by the satellite positioning module 7.

When the outer shape of the farm field defined by the inner boundary line of the ridge is determined, a travel route for travel and work in the farm field is calculated. At this time, a virtual turning circle, which will be described in detail later, can be set. In the example shown in FIG. 2, the tractor repeats straight forward travel of traveling along a linear travel route (indicated by a reference sign SL in FIG. 2), and turning travel (the route of which is indicated by a reference sign TL in FIG. 2) to move from one linear travel route (a previous travel route) to another linear travel route (a subsequent travel route). Typically, turning travel is performed such that the tractor passes over at least one linear travel route. During the straight forward travel, the cultivator 30 is lowered to perform cultivation work. Typically, during the turning travel, the cultivator 30 is raised and the cultivation work is interrupted.

Figure 3:
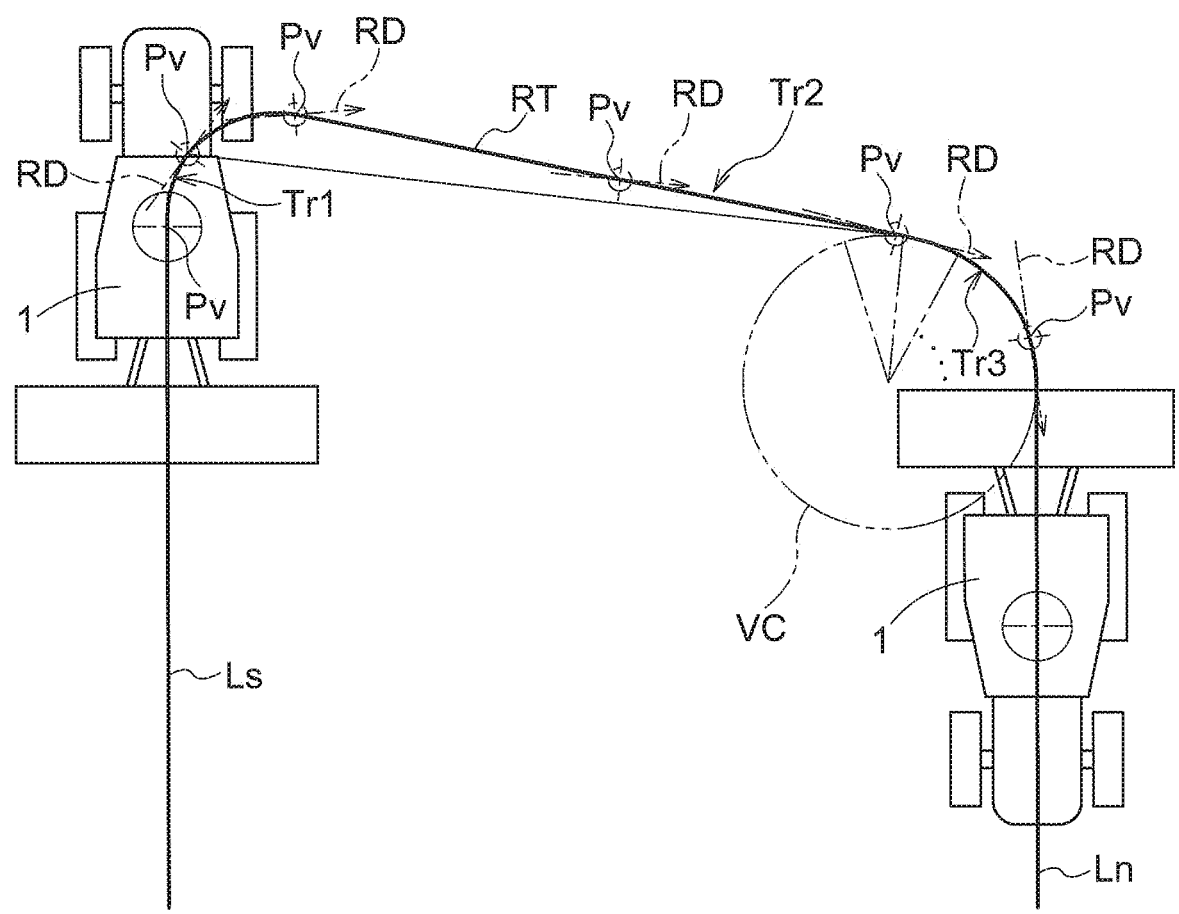
FIG. 3 is a diagram schematically illustrating a travel route for the tractor in basic turning travel from a previous travel route to a subsequent travel route.

FIG. 3 schematically shows a basic example of the turning travel using automatic steering. In this example, simple turning travel of moving from a linear travel route (origin) indicated by the reference sign Ls to a linear travel route (destination) indicated by the reference sign Ln is shown. In the present application, the linear travel route serving as the origin is defined as a previous travel route Ls, and the linear travel route serving as the destination is defined as a subsequent travel route Ln.

When reaching the terminal end of the previous travel route Ls, the tractor performs leaving turning travel of leaving the previous travel route Ls for the subsequent travel route Ln. A travel path of the leaving turning travel is denoted by Tr1.

The leaving turning travel of leaving the previous travel route Ls is performed at a preset steering angle, and transitions to tangent following travel during the leaving turning travel. At a starting end of the subsequent travel route Ln or at a position near a starting end of an extended line thereof, a virtual turning circle VC is set that is located on the previous travel route Ls side with respect to with the subsequent travel route Ln and is in contact with the subsequent travel route Ln. A tangent to the virtual turning circle VC from a vehicle body reference point Pv of the tractor that is performing the leaving turning travel is calculated. Here, the vehicle body reference point Pv is substantially the central point of the tractor, but may be set at any position. The orientation of the line passing through the vehicle body reference point Pv and extending in a direction of travel of the tractor is defined as a travel orientation. The tractor performs the tangent following travel using the orientation of the calculated tangent as a target orientation. When the angle between the calculated tangent and the travel orientation is within a predetermined angle during the tangent following travel, this tangent is set as a reference tangent RT. When the reference tangent RT is set, the tractor performs entry turning travel to enter the subsequent travel route Ln using the reference tangent RT as a transition target route and using the virtual turning circle VC as a turning target route. The travel path using the reference tangent RT as a transition target route is denoted by Tr2 and is shown in FIG. 3. When the travel in the transition target route advances, and the vehicle body reference point Pv of the tractor approaches the virtual turning circle VC, the tractor starts eventual turning travel of traveling along the virtual turning circle VC. The travel path of the eventual turning travel is denoted by Tr3. When the eventual turning travel advances, and the vehicle body reference point Pv of the tractor approaches the starting end of the subsequent travel route Ln or a position near a starting end of the extended line thereof, the tractor ends the eventual turning travel, and starts straight forward travel using the subsequent travel route Ln as a target route.

Figure 4:
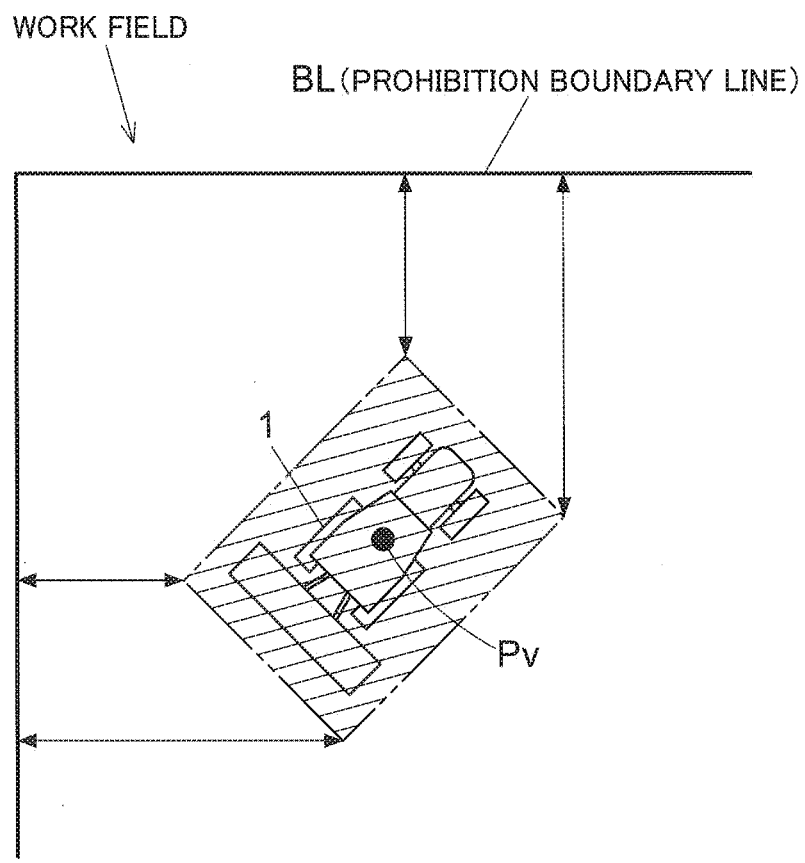
FIG. 4 illustrates a positional relationship between a prohibition boundary line and the tractor.

Since the tractor is equipped with the satellite positioning module 7, map coordinates (such as terrestrial coordinate system or farm field coordinate system) of any point of the vehicle body 1, for example, the vehicle body reference point Pv can be calculated. As shown in FIG. 4, distances between the tractor and the prohibition boundary line BL are calculated to detect the positional relationship between the tractor and the prohibition boundary line BL. In this example, the tractor is shown as a rectangle of a predetermined size (rectangle surrounding the outline of the tractor), and the lengths of line segments perpendicular to the prohibition boundary line BL from the respective corners of the rectangle are calculated as the distances from the respective corners of the rectangle to the prohibition boundary line BL. In FIG. 4, the shortest distance to the prohibition boundary line BL that extends laterally is a distance from the front left corner to the prohibition boundary line BL, and the shortest distance to the prohibition boundary line BL that extends vertically is a distance from the rear left corner to the prohibition boundary line BL. The map coordinates of each corner are calculated based on the map coordinates of the vehicle body reference point Pv.

Figure 5:
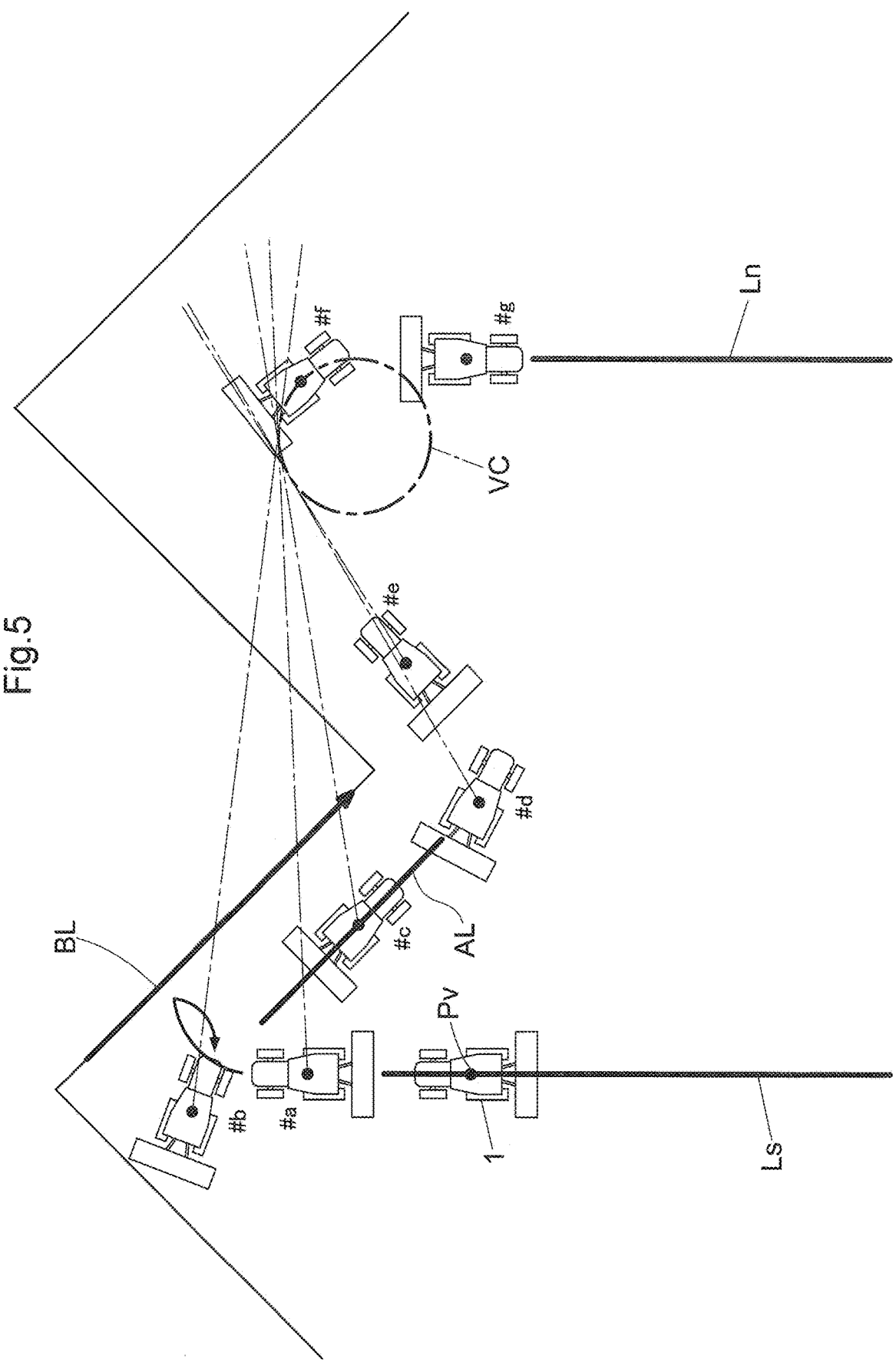
FIG. 5 is a diagram schematically illustrating movement of the tractor in turning travel using an interference avoidance route from the previous travel route to the subsequent travel route.

The following will describe transition travel from the previous travel route Ls to the subsequent travel route Ln when a prohibition boundary line BL is present between the previous travel route Ls and the subsequent travel route Ln. As shown in FIG. 5, the prohibition boundary line BL extends in a zig-zag manner, and a virtual turning circle VC is set near the start point of the subsequent travel route Ln. A tangent drawn to the virtual turning circle VC from the vehicle body reference point Pv of the vehicle body 1 having passed by the end point of the previous travel route Ls intersects with the prohibition boundary line BL extending in a protruding shape. Accordingly, in the state shown in FIG. 5, if the tractor performs transition travel as shown in FIG. 3, the tractor will interfere with the prohibition boundary line BL. The prohibition boundary line BL that interferes with the tractor when the tractor advances is referred to as an interference boundary line (indicated by a bold arrow in FIG. 5), and travel to avoid such an interference with the interference boundary line is referred to as interference avoidance travel.

FIG. 5 shows a path of the vehicle body 1 in the interference avoidance travel. There is an interference boundary line in the orientation of the vehicle body 1 having passed by the end point of the previous travel route Ls toward the virtual turning circle VC (#a). Therefore, an interference avoidance route AL for avoiding an interference with the interference boundary line is first set. In the example in FIG. 5, the tractor may cross the prohibition boundary line BL when turning to the set interference avoidance route AL, and thus a specific direction-change mode is used to execute space-saving turning travel using a k-turn or a turn with a left-right speed difference (#b). In FIG. 5, a k-turn is performed as the space-saving turning travel. The interference avoidance route AL is set at a position at which the tractor can travel at a distance from the interference boundary line. Typically, the interference avoidance route AL is a line parallel to the prohibition boundary line BL. The tractor automatically travels using the interference avoidance route AL as a travel target route (#c).

When having accomplished the interference avoidance route AL, the tractor turns to the virtual turning circle VC (#d), and performs tangent following travel toward the virtual turning circle VC (#e). Then, upon reaching the virtual turning circle VC, the tractor turns and travels using the virtual turning circle VC as a turning target route (#f), and eventually moves to the subsequent travel route Ln (#g).

Figure 6:
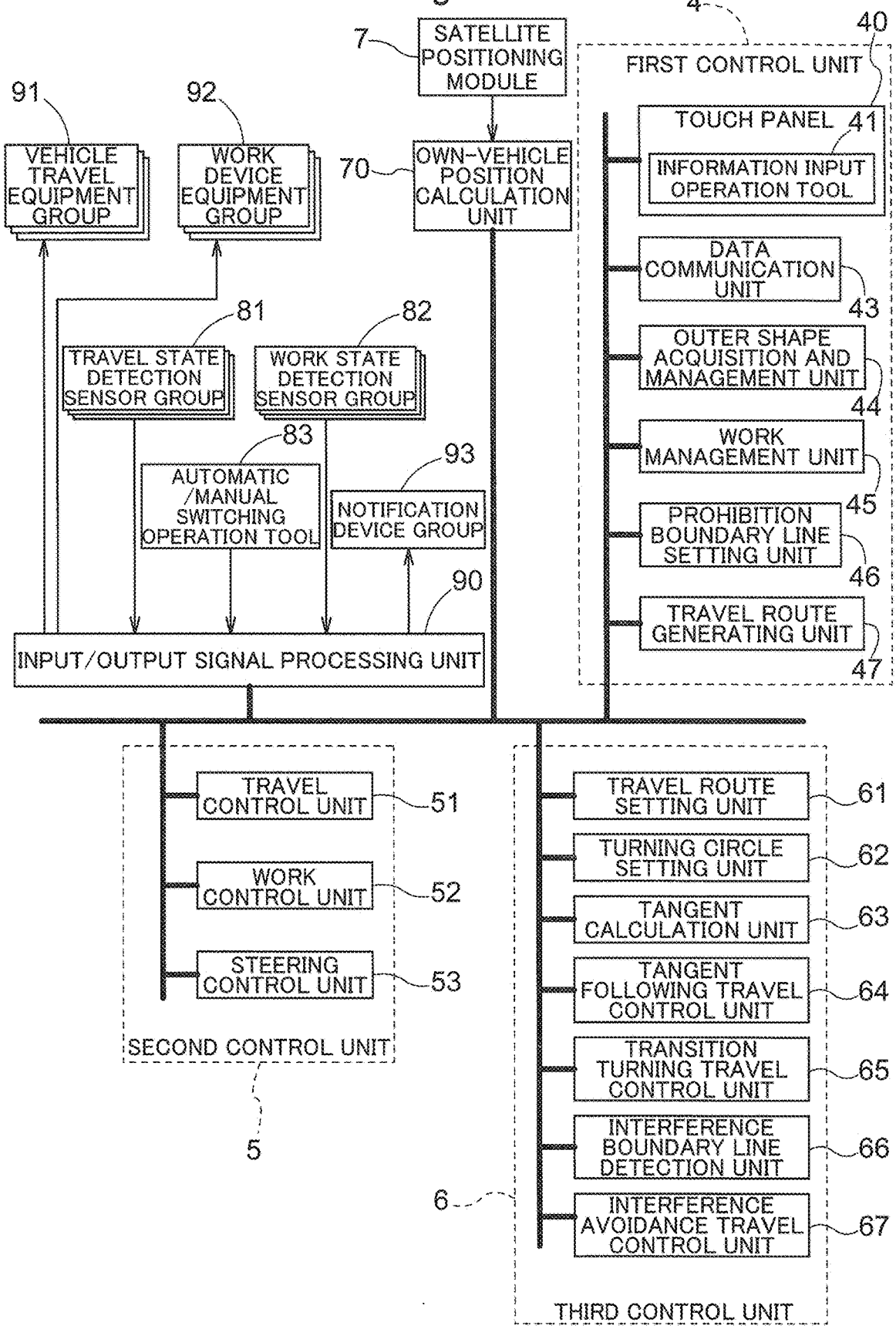
FIG. 6 is a functional block diagram illustrating a control system relating to automatic travel of the tractor.

A control system for automatically controlling the above-described transition turning travel will be described. FIG. 6 shows a functional block diagram showing an automatic travel control system for a tractor. The control system includes a first control unit including the data processing terminal 4, a second control unit 5 to control various control devices of the vehicle body 1, a third control unit 6 to mainly control the transition turning travel, and an input/output signal processing unit 90. The data processing terminal 4, the second control unit 5, the third control unit 6, and the input/output signal processing unit 90 are connected to each other via an in-vehicle LAN, control signal lines, or the like so as to be able to perform mutual data transmission. The data processing terminal 4 may have a configuration in which it is detachable from the tractor and can be used outside the tractor.

The input/output signal processing unit 90, which serves as an input/output interface, has a function of connecting to a data/signal line, the in-vehicle LAN, a wireless communication line, and a wired communication line. A vehicle travel equipment group 91, a work device equipment group 92, a notification device 93, and the like are connected to the data processing terminal 4 and the second control unit 5 via the input/output signal processing unit 90. Therefore, the input/output signal processing unit 90 has, for example, an output signal processing function, an input signal processing function, and a communication function of transmitting data via the data/signal line, the wireless line, or the wired line. The vehicle travel equipment group 91 includes the steering motor 14 of the steering mechanism 13, an engine control device, a transmission device, and the like. The work device equipment group 92 includes, for example, a power transmission clutch of the cultivator 30, which is a work device, and a lifting cylinder of a lifting mechanism. The notification device 93 includes an instrument, a buzzer, a lamp, a liquid crystal display, and the like. Furthermore, switches and buttons such as a travel state detection sensor group 81, a work state detection sensor group 82, and an automatic/manual switching operation tool 83 are also connected to the input/output signal processing unit 90.

The positioning data acquired by the above-described satellite positioning module 7 is processed by an own-vehicle position calculation unit 70, and the position of a predetermined portion of the tractor in map coordinates or farm field coordinates is output as an own-vehicle position.

The data processing terminal 4 includes the touch panel 40, a data communication unit 43, an outer shape acquisition and management unit 44, a work management unit 45, a prohibition boundary line setting unit 46, and a travel route generating unit 47. The touch panel 40 gives a user various types of information and accepts input operations of the user. The input operations of the user are made using an information input operation tool 41 such as a software switch or a hardware switch. The data communication unit 43 acquires, from an external computer or storage medium, work travel information including the location of a farm field, which is a work field, the type of work to be conducted in the farm field, and the like. The acquired work travel information is managed by the work management unit 45.

The outer shape acquisition and management unit 44 determines the outer shape of a farm field based on the travel path obtained by the tractor that has entered the farm field circling along an inner boundary line of a ridge. Note that the outer shape acquisition and management unit 44 can also use the outer shape of the farm field obtained in a previously performed farm field work or the like.

The prohibition boundary line setting unit 46 sets a prohibition boundary line BL beyond which the tractor is prohibited from entering, based on information on the outer shape of the farm field managed by the outer shape acquisition and management unit 44. Note that, if there is any iron tower, water facility, or the like in the farm field, the prohibition boundary line setting unit 46 also sets the boundary line thereof as the prohibition boundary line BL. Furthermore, the prohibition boundary line setting unit 46 can also set, as the prohibition boundary line BL, the boundary line of at least a portion of a region that the tractor has not yet worked.

The travel route generating unit 47 refers to the information on the farm field such as the outer shape of the farm field, and executes a travel route generation program installed in advance to generate a travel route and a virtual turning circle VC. Note that the travel route generating unit 47 may also accept and manage an externally generated travel route.

The second control unit 5 includes a travel control unit 51, a work control unit 52, and a steering control unit 53, serving as basic control function units for the tractor to automatically travel and work.

The travel control unit 51 has a manual travel control mode and an automatic travel control mode. When the manual travel control mode is selected, the travel control unit 51 gives a control signal to the vehicle travel equipment group 91 based on an operation of a driver performed on a gas pedal or a shift lever. When the automatic travel control mode is selected, the travel control unit 51 controls the vehicle body 1 to travel, with the number of engine rotations or the vehicle speed defined by an automatic travel parameter. The automatic/manual switching operation tool 83 is used to switch the mode between the manual travel control mode and the automatic travel control mode, but the mode may also be switched automatically based on the work travel state of the tractor.

Similarly, the work control unit 52 has an automatic work control mode and a manual work control mode. When the manual work control mode is selected, the work control unit 52 gives a control signal to the work device equipment group 92 based on an operation of the driver performed on a work operation tool. When the automatic work control mode is selected, the work control unit 52 gives a signal to the work device equipment group 92 based on an automatic work parameter to keep the position of the cultivator 30 or move the cultivator 30 up and down as defined by the automatic work parameter.

The steering control unit 53 outputs an operation control signal to the steering motor 14 based on a steering instruction output from the third control unit 6.

The third control unit 6 generates a steering instruction to instruct the tractor to follow the target route, based on a target route set by a travel route setting unit 61 and a travel orientation calculated from the own-vehicle position and successive own-vehicle positions transmitted from the own-vehicle position calculation unit 70, and gives the generated steering instruction to the steering control unit 53.

The third control unit 6 performs automatic travel control for transition from a previous travel route Ls to a subsequent travel route Ln via turning travel, as described with reference to FIGS. 2 to 5. For this purpose, the third control unit 6 includes a travel route setting unit 61, a turning circle setting unit 62, a tangent calculation unit 63, a tangent following travel control unit 64, a transition turning travel control unit 65, an interference boundary line detection unit 66, and an interference avoidance travel control unit 67.

The travel route setting unit 61 sets the travel route generated and managed by the travel route generating unit 47, as a target route for a target of automatic travel. Before the transition from a previous travel route Ls to a subsequent travel route Ln via turning travel, the turning circle setting unit 62 sets a virtual turning circle VC as a target route for entry turning travel of entering the subsequent travel route Ln.

The tangent calculation unit 63 calculates a tangent to the virtual turning circle VC from a vehicle body reference point Pv calculated during travel. Specifically, the tangent calculation unit 63 calculates tangents from a vehicle body reference point Pv to the virtual turning circle VC at predetermined time intervals or predetermined travel distance intervals, and calculates the angle of difference between the tangents and the travel orientation (travel orientation line) of the vehicle body 1. Furthermore, the tangent calculation unit 63 regards the tangent when the angle of difference is within a preset predetermined angle (for example, 30 degrees), as the reference tangent RT (see FIG. 3). The tangent following travel control unit 64 controls the tangent following travel using the orientation of the tangent as a target orientation.

In the tangent following travel by the tangent following travel control unit 64, the transition turning travel control unit 65 regards that tangent when the angle of difference is within the predetermined angle as the transition target route, and controls the travel of the vehicle body 1. When the vehicle body 1 has reached the virtual turning circle VC, the transition turning travel control unit 65 controls the travel of the vehicle body 1 using the virtual turning circle VC as a turning target route.

In travel toward the virtual turning circle VC after completion of the travel in the previous travel route Ls, or the tangent following travel controlled by the tangent following travel control unit 64, the interference boundary line detection unit 66 detects the prohibition boundary line present in the moving direction of the vehicle as an interference boundary line.

The interference avoidance travel control unit 67 controls interference avoidance travel for avoiding the tractor from interfering with (crossing) the prohibition boundary line BL regarded as the interference boundary line by the interference boundary line detection unit 66. The interference avoidance travel control unit 67 calculates the interference avoidance route AL as a target route for the interference avoidance travel, and sets the calculated interference avoidance route AL. The interference avoidance route AL is a route that the tractor can travel at a distance from the interference boundary line, and has the same or substantially the same length as that of the interference boundary line. Upon completion of the interference avoidance travel controlled by the interference avoidance travel control unit 67, the tangent following travel control is started again to steer the vehicle body 1 toward the virtual turning circle VC.

Figure 7:
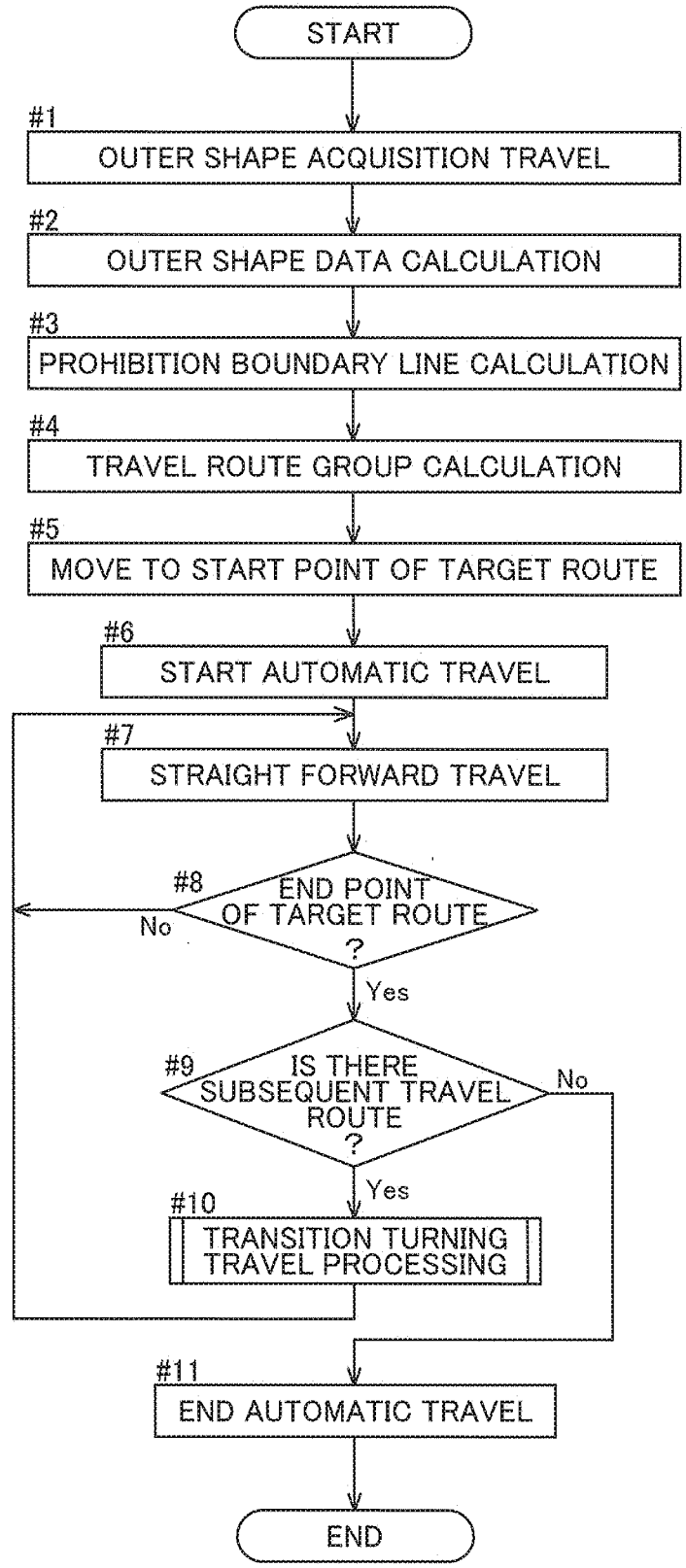
FIG. 7 is a flowchart illustrating an example of a schematic flow during the turning travel.
Figure 8:
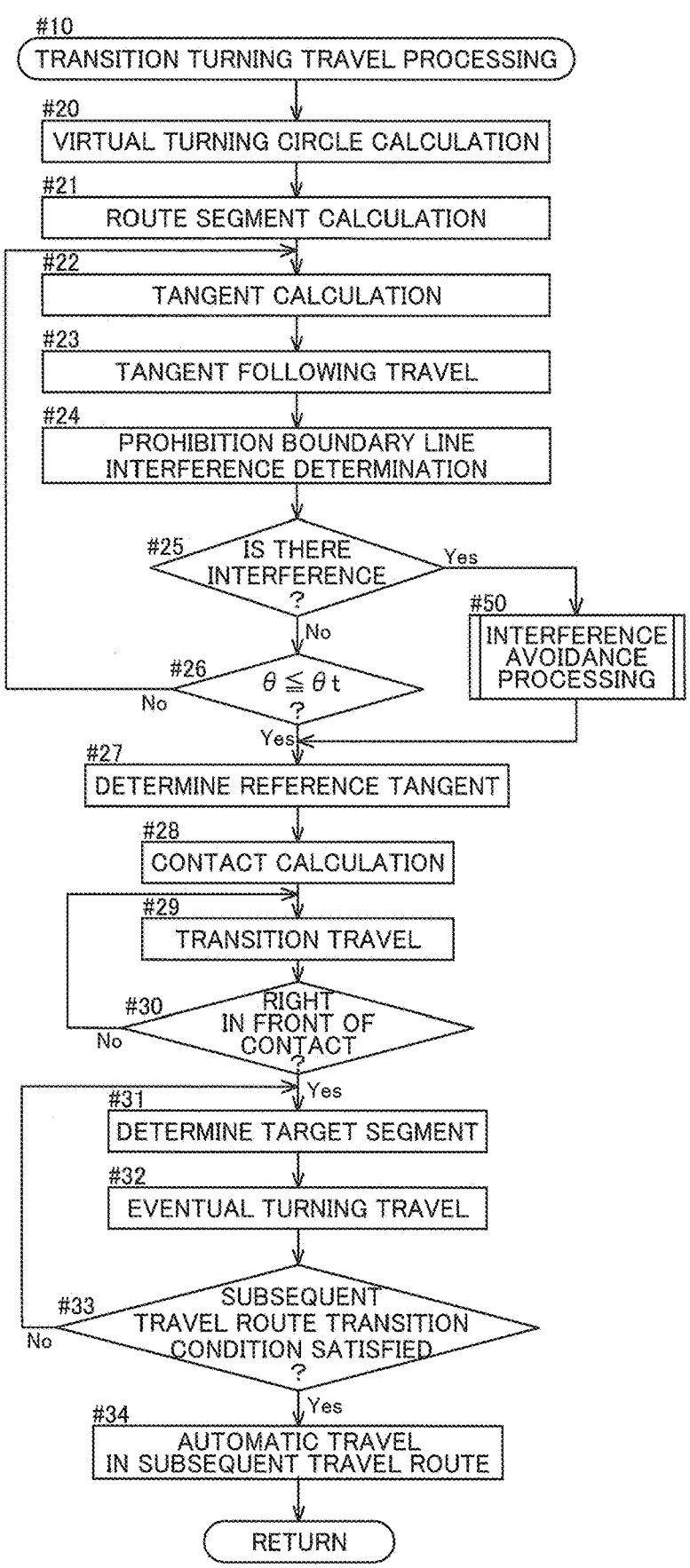
FIG. 8 is a flowchart illustrating transition turning travel processing.
Figure 9:
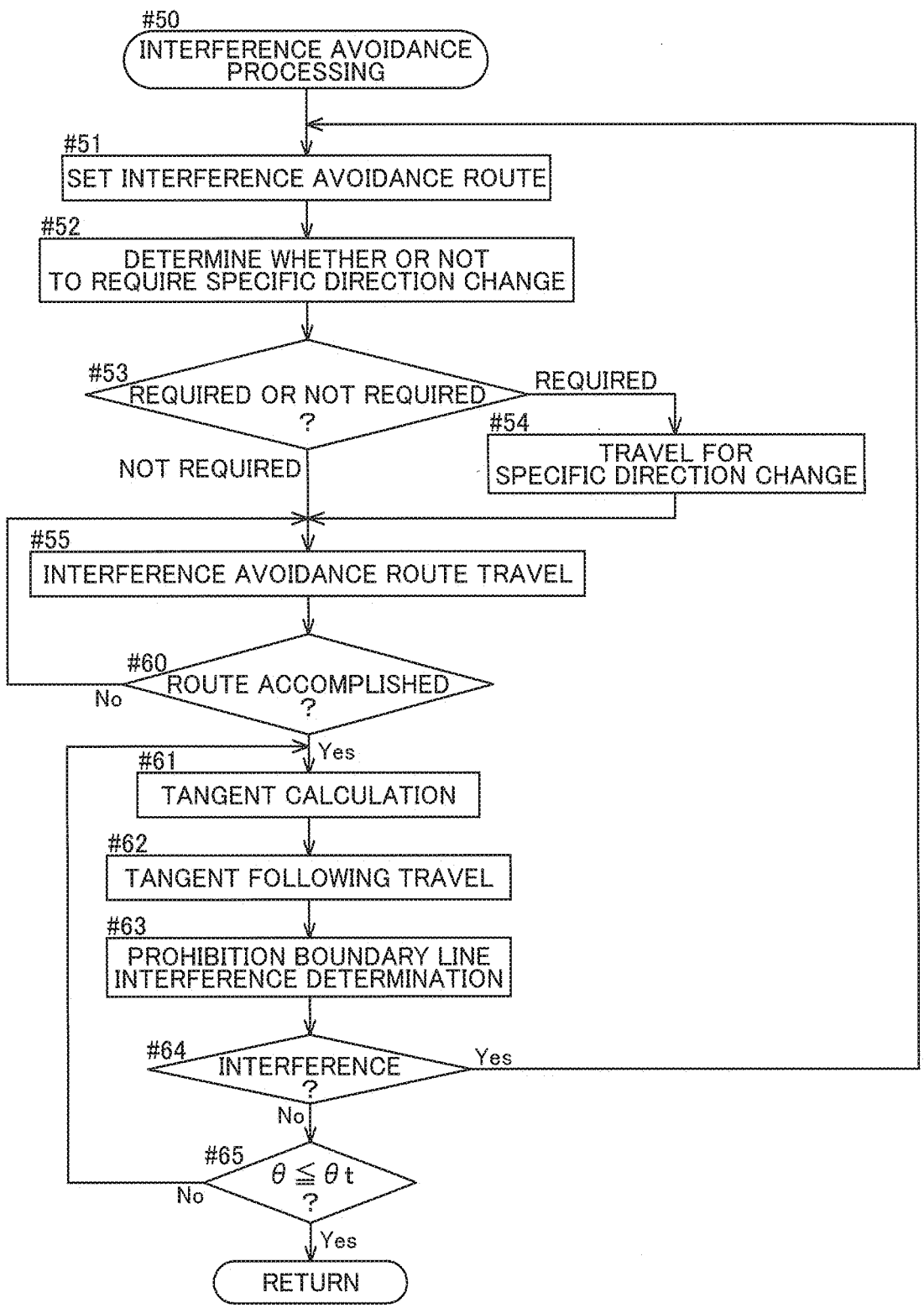
FIG. 9 is a flowchart illustrating interference avoidance processing.
Figure 10:
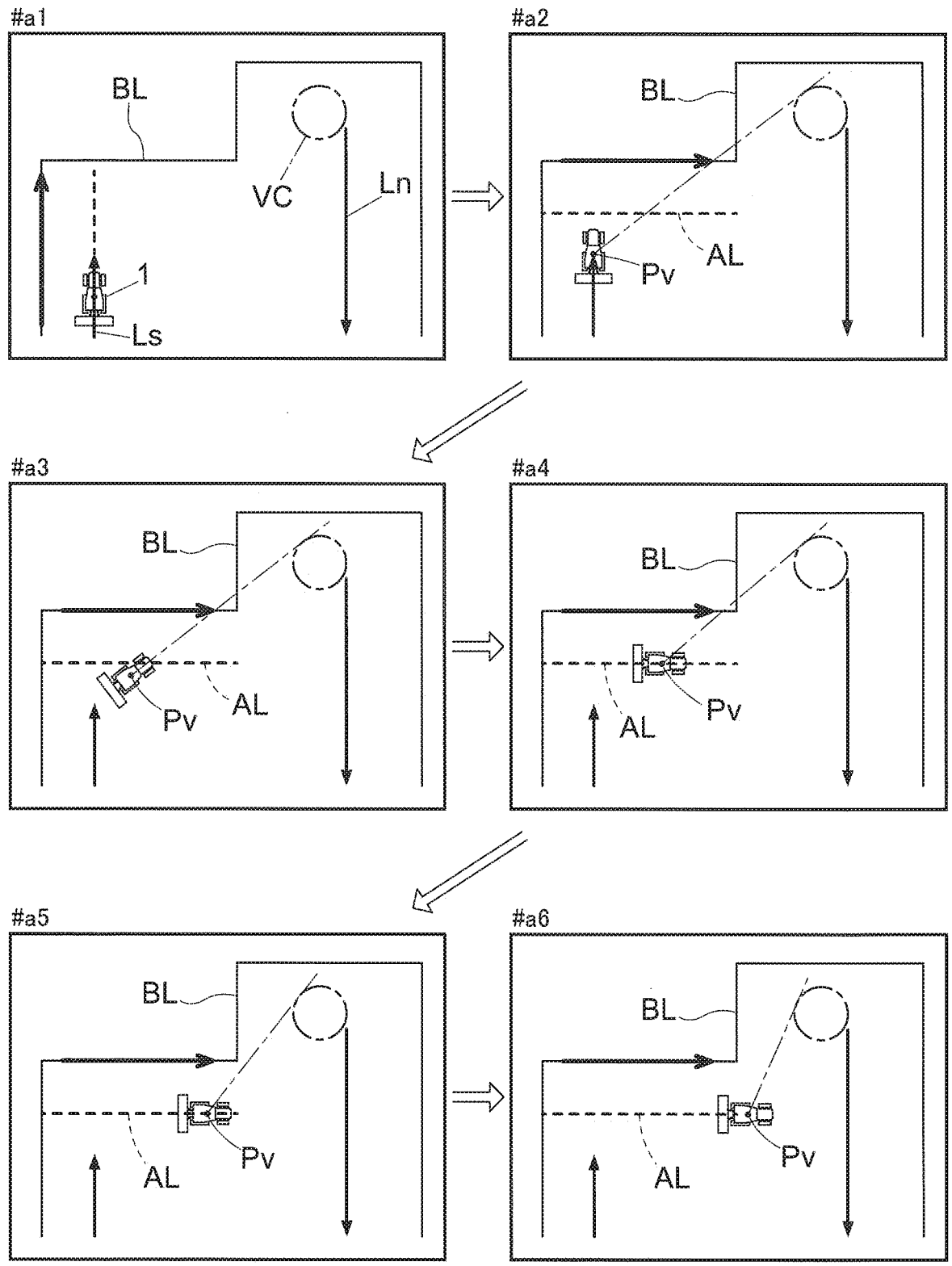
FIG. 10 schematically illustrates movement of the tractor in the first half of an example of the turning travel using the interference avoidance route.
Figure 11:
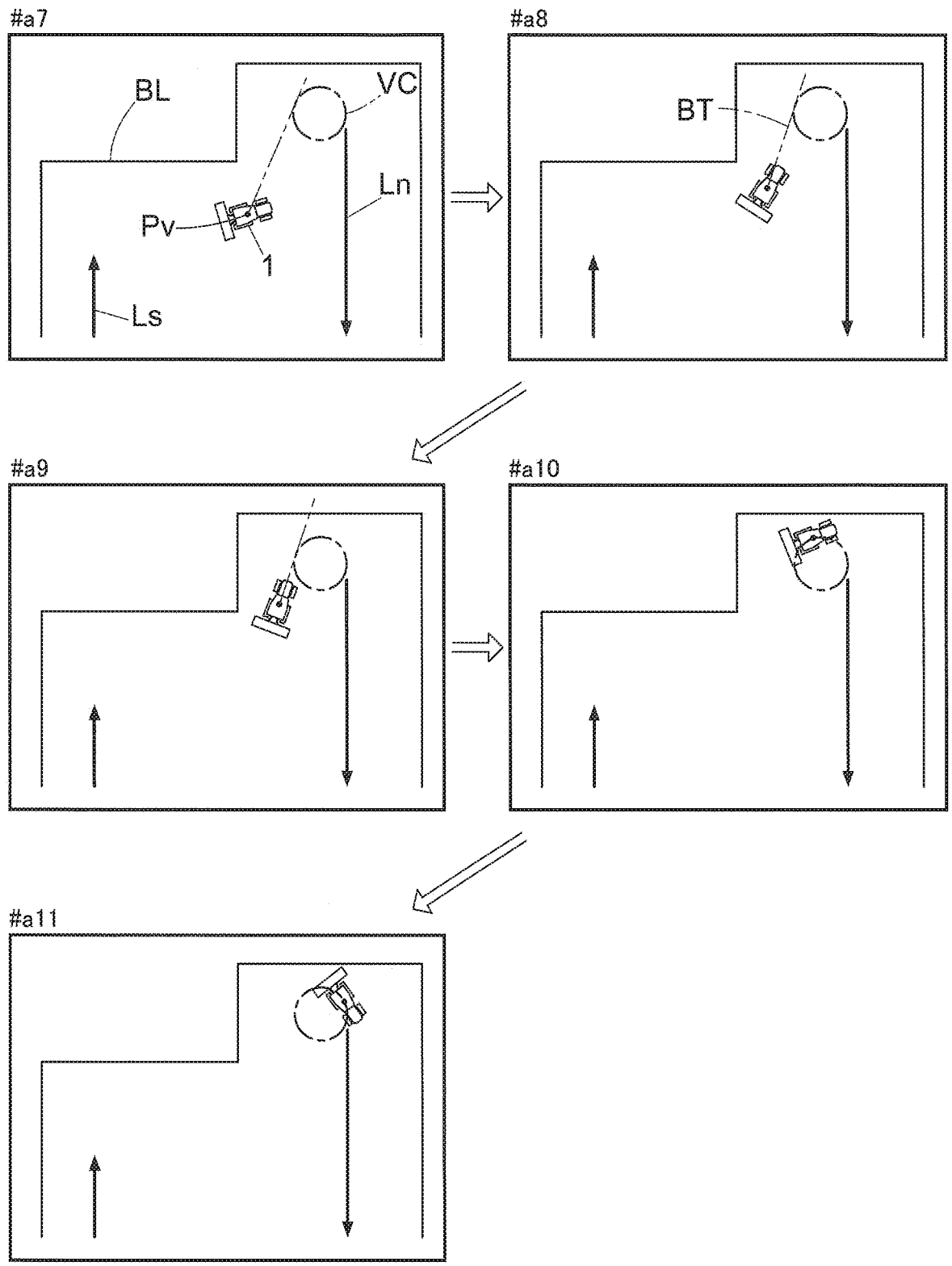
FIG. 11 schematically illustrates movement of the tractor in the last half of the example of the turning travel using the interference avoidance route.

The following will describe an example of behavior of the tractor equipped with the above-described automatic travel system in a farm field, with reference to the flowcharts in FIGS. 7 to 9 and the schematic diagrams of behavior of the tractor in FIGS. 10 and 11.

First, the tractor circles an outer periphery of a farm field surrounded by a ridge or the like to acquire the outer shape of the farm field (#1). Data on the outer shape of the farm field is calculated based on a travel path of the vehicle body 1 obtained through the circling thereof (#2). A prohibition boundary line BL is calculated based on the calculated data on the outer shape (#3). Linear travel routes as shown in FIG. 2 and the travel order thereof are calculated based on the calculated data on the outer shape (#4). Note that at the same time as the calculation of the linear travel routes, a virtual turning circle VC may be set in the vicinity of the start point of a linear travel route, or the setting of the virtual turning circle VC may be made at the stage where a transition from the linear travel route to the subsequent travel route Ln is made.

The tractor moves to the start point of the target route (linear travel route) set as the first route (#5). The automatic travel is started (#6) and the tractor performs straight forward travel until the tractor reaches the end point of the target route (#7). When the tractor has reached the end point of the target route ("Yes" branch in #8), it is checked whether or not there is any linear travel route (subsequent travel route Ln) that the tractor is to travel next (#9), and if there is any linear travel route that the tractor is to travel next ("Yes" branch in #9), the procedure advances to the transition turning travel processing (see FIG. 8) of moving to the next travel route using turning travel (#10). In the transition turning travel processing, the linear travel route that the tractor has traveled serves as a previous travel route Ls, and the linear travel route that the tractor is to travel serves as a subsequent travel route Ln. Note that if there is no linear travel route that the tractor is to travel next ("No" branch in #9), the automatic travel in the farm field ends (#11).

In the transition turning travel processing shown in FIG. 8, a virtual turning circle VC is calculated that is to be set in the vicinity of the start point of the subsequent travel route Ln (#20) (see #a1 in FIG. 10). In the case of turning travel using the virtual turning circle VC as a target route, a route segment obtained by segmenting the virtual turning circle VC is used as a target route, and thus the route segment is also calculated based on the calculated virtual turning circle VC (#21).

The tractor performs leaving turning travel at a predetermined steering angle, for example, with a minimum turning radius, and a tangent to the virtual turning circle VC from a vehicle body reference point Pv is calculated (#22) (see #a2 in FIG. 10). Tangent following travel of conforming the orientation of the vehicle body 1 to the orientation of the calculated tangent is performed (#23). Then, prohibition boundary line interference determination of determining whether or not there is any prohibition boundary line BL in the moving direction of the vehicle body 1 in the tangent following travel or in the extending direction of the tangent is made, that is, it is determined whether or not the vehicle body 1 interferes with the prohibition boundary line BL if the vehicle continues traveling (#24). If it is determined that the tractor does not interfere with the prohibition boundary line BL ("No" branch in #25), it is checked whether or not an angle θ between the calculated tangent and the travel orientation of the tractor is within a predetermined angle difference θt (#26). If the angle θ is not within the predetermined angle difference θt ("No" branch in #26), the procedure returns to step #22, and the tangent following travel is continued. If the angle θ is within the predetermined angle difference θt ("Yes" branch in #26), the tangent at that point in time is determined as the reference tangent RT, and positional data indicating this tangent is calculated (#27). Furthermore, positional data indicating a contact to the tangent is also calculated (#28).

Subsequently, automatic travel (transition travel to the virtual turning circle VC) is performed using the reference tangent RT as a target route (#29). In this transition travel, when the vehicle body reference point Pv of the tractor has approached a position right in front of the contact of the reference tangent RT ("Yes" branch in #30), the transition travel ends. The target route transitions to a segment of the virtual turning circle VC (#31), and eventual turning travel is performed (#32). In this turning travel, route segments to serve as target routes are sequentially selected, and automatic steering is performed so as to follow the selected route segments. When the turning travel advances, and a subsequent travel route transition condition for the tractor to enter the subsequent travel route Ln (a difference in orientation between the vehicle body 1 and the subsequent travel route Ln, and a difference in distance between the vehicle body 1 and the subsequent travel route Ln) is satisfied ("Yes" branch in #33), it is determined to make a transition to travel control using the subsequent travel route Ln as a target route (#34). With this, the processing ends, and returns to step #7 in FIG. 7.

In the prohibition boundary line interference determination in step #24, if the tractor interferes with the prohibition boundary line BL ("Yes" branch in #25), the interference avoidance processing is performed (#50). In the interference avoidance processing shown in FIG. 9, an interference avoidance route AL is first set that is parallel to a portion of the prohibition boundary line BL regarded as the interference boundary line, and that is distanced therefrom to the extent that the tractor can travel (#51) (see #a2 in FIG. 10). Furthermore, it is determined whether or not to require a specific direction change such as a k-turn for performing the interference avoidance processing, in order to ensure the position of the vehicle body 1 for starting travel using the interference avoidance route AL as a target route (#52). If no specific direction change is required ("Not required" branch in #53), automatic travel using the interference avoidance route AL as a target route is started (#55) (see #a3 and #a4 in FIG. 10). If a specific direction change is required ("Required" branch in #53), an appropriate specific direction change is performed (#54), and then automatic travel (interference avoidance travel) using the interference avoidance route AL as a target route is started (#55) (see #a5 in FIG. 10).

During the interference avoidance travel, it is checked whether or not the tractor has accomplished the interference avoidance route AL (#60). If it is determined that the tractor has accomplished the interference avoidance route AL ("Yes" branch in #60), a tangent to the virtual turning circle VC from the vehicle body reference point Pv is calculated again (#61) (see #a6 in FIG. 10). Then, tangent following travel using the calculated tangent is performed (#62) (see #a7 in FIG. 11).

Also in the tangent following travel, prohibition boundary line interference determination of determining whether or not the vehicle body 1 interferes with the prohibition boundary line BL is made (#63). If it is determined that the tractor is to interfere with the prohibition boundary line BL ("Yes" branch in #64), the procedure jumps to step #51, and the interference avoidance processing is again performed. As long as the tractor does not interfere with the prohibition boundary line BL ("No" branch in #64), the tangent following travel is continued. In the tangent following travel, the processing from steps #61 to #65 is continued until the angle θ between the calculated tangent and the travel orientation of the tractor is within the predetermined angle difference θt. If the angle θ between the calculated tangent and the travel orientation of the tractor is within the predetermined angle difference θt ("Yes" branch in #65), the processing ends and the procedure returns to step #27 in FIG. 8. Upon returning to step #27 in FIG. 8, as described above, entry turning travel for entering the subsequent travel route Ln is performed using the reference tangent RT as a transition target route, and using the virtual turning circle VC as a turning target route (see #a8, #a9, #a10, and #a11 in FIG. 11).

The automatic travel system enables the tractor to travel while avoiding from traveling again in a worked region, which has already been worked. In this worked-region avoidance travel, the prohibition boundary line setting unit 46 sets the outline of the worked region as a prohibition boundary line BL. Because the worked region increases as the work travel advances, the outline of the worked region also changes. The prohibition boundary line setting unit 46 updates the prohibition boundary line BL in accordance with a change in the outline of the worked region. Note that the worked region is not limited to a region that has already been worked by the same tractor, and a region that has already been worked by another tractor or another agricultural work vehicle may also be defined as the worked region. Particularly, when a plurality of tractors (agricultural work vehicles) work the same farm field in a coordinated manner, the plurality of tractors can use mutual data communication to perform notification to each other of a region that have already worked or a travel route in which work travel has been performed, and can recognize worked regions in the entire farm field. Alternatively, a configuration can also be used in which a monitoring computer is provided to exchange data with the plurality of tractors and managing operations of the plurality of tractors, and the tractors are notified of worked regions (worked regions of the entire farm field) that were worked by the plurality of tractors and are managed by the monitoring computer. As a specific example, at a point in time when the work travel along the travel route set as a target route is complete, the travel route setting unit 61 gives a flag "worked route" to the travel route. With this, the travel route setting unit 61 can distinguishably manage unworked routes and worked routes. Instead of the flag, another identification mark may also be given. The worked region is calculated based on the worked routes managed in this manner and the work width of the worked route during the work travel, and the worked region of the entire farm field is successively updated. In the case of coordinated work by a plurality of tractors, the worked region updated successively is shared by the tractors, and thus it is possible to avoid the tractor from traveling again in the worked region.

An example of the transition turning travel using the worked-region avoidance travel will be described with reference to FIG. 12. In the example of FIG. 12, the farm field has a protruding shape with the prohibition boundary lines BL extending in a mountain shape, and a worked region worked by preceding work travel is indicated by a hatched line, and extends deep into the protruding shaped area. The outline of the worked region is indicated by a dotted outline BLS. The previous travel route Ls and the subsequent travel route Ln are located with the worked region interposed therebetween. A virtual turning circle VC is set in the vicinity of the start point of the subsequent travel route Ln.

In the vicinity of the end point of the previous travel route Ls, the tangent drawn from the vehicle body reference point Pv to the virtual turning circle VC intersects with the outline BLS of the worked region, and there is the left-side prohibition boundary line BL in the moving direction of the vehicle body 1 (#b1). The left-side prohibition boundary line BL and the outline BLS are regarded as interference boundary lines, and an interference avoidance route AL that extends along the left-side prohibition boundary line BL is set. Accordingly, the vehicle body 1 travels using the interference avoidance route AL as a target route, instead of directly advancing to the virtual turning circle VC (#b2). When the vehicle body 1 has passed by the worked region, an interference avoidance route AL is set that extends along the segment extending lateral to the outline BLS of the worked region (#b3). The vehicle body 1 travels using this interference avoidance route AL as a target route, and upon reaching a position at which a tangent drawn to the virtual turning circle VC from the vehicle body reference point Pv does not intersect with the outline BLS of the worked region, the vehicle body 1 starts turning travel for directing to the virtual turning circle VC (#b4). With this, the tangent following travel is performed, and the tractor further travels using the reference tangent RT as a transition target route (#b5). When the vehicle body 1 has reached the virtual turning circle VC, entry turning travel for entering the subsequent travel route Ln is performed using the virtual turning circle VC as a turning target route (#b6).

OTHER PREFERRED EMBODIMENTS

In the above-described preferred embodiment, the positional relationship between the prohibition boundary line BL and the vehicle body 1 of the tractor, as shown in FIG. 4, is defined based on the map coordinates of the vehicle body 1 calculated from satellite positioning data of the satellite positioning module 7. Alternatively or additionally, the positional relationship between the prohibition boundary line BL and the vehicle body 1 of the tractor may be defined based on measured data from a distance measurement device provided in the vehicle body 1.

The segmentation of the functional units in the functional block diagram of FIG. 6, and the segmentation of the data processing terminal 4, the second control unit 5, and the third control unit 6 are examples for ease of description, and it is optional to integrate various functional units or divide a single functional unit into a plurality of units.

Although, in the above-described preferred embodiment, the tractor equipped with the cultivator 30 serving as a work device is exemplified as a work vehicle, the present invention is also applicable to a tractor equipped with a work device other than the cultivator 30, and further to an agricultural work machine such as a combine or a rice planter, a construction machine, and the like.

It should be noted that the configurations disclosed in the above-described preferred embodiments (including the other preferred embodiments, the same applies below) can be applied in combination with configurations disclosed in other preferred embodiments so long as no contradiction arises, the preferred embodiments disclosed in the present specification are mere examples, and preferred embodiments of the present invention are not limited to those disclosed in the present specification and can be modified as appropriate without departing from the object of the present invention.

Preferred embodiments of the present invention are applicable to an automatic travel technique for a vehicle that moves from a previous travel route to a subsequent travel route via turning travel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automatic travel system for a vehicle that is movable from a previous travel route to a subsequent travel route via turning travel, the automatic travel system comprising:
    a prohibition boundary line setter to set a prohibition boundary line beyond which the vehicle is prohibited from entering;
    a turning circle setter to set a virtual turning circle as a target route for entry turning travel to enter the subsequent travel route;
    a tangent calculator to calculate a tangent to the virtual turning circle from a vehicle body reference point that is calculated during travel;
    a tangent following travel controller to control tangent following travel using an orientation of the tangent as a target orientation;
    a transition turning travel controller to, when an angle between a travel orientation of the vehicle and the tangent is within a predetermined angle in the tangent following travel, control the entry turning travel of the vehicle using the tangent as a transition target route and using the virtual turning circle as a turning target route;
    an interference boundary line detector to detect, as an interference boundary line, the prohibition boundary line that is present in a moving direction of the vehicle in the tangent following travel; and an interference avoidance travel controller to control interference avoidance travel to avoid the vehicle from interfering with the interference boundary line; wherein
the interference avoidance travel controller is configured or programmed to set an interference avoidance route that is a line parallel to the interference boundary line and that is at a position at which the vehicle can travel at a distance from the interference boundary line; and
upon completion of travel of the vehicle in the interference avoidance route controlled by the interference avoidance travel controller, automatic travel control for the vehicle is taken over by the tangent following travel controller.

2. The automatic travel system according to claim 1, wherein the interference avoidance travel controller is configured or programmed to include a specific direction-change mode to execute space-saving turning travel using a k-turn or a turn with a left-right speed difference.

3. The automatic travel system according to claim 1, wherein
the vehicle is a work vehicle that is operable to automatically travel in a work field while performing ground work; and
the prohibition boundary line setter is operable to set an inside/outside boundary line of the work field, as the prohibition boundary line.

4. The automatic travel system according to claim 3, wherein the prohibition boundary line setter is operable to set a boundary line of at least a portion of a region that the work vehicle has not yet worked, as the prohibition boundary line.

5. The automatic travel system according to claim 1, wherein leaving turning travel to leave the previous travel route is performed at a preset steering angle, and the tangent following travel controlled by the tangent following travel controller is performed during the leaving turning travel.

6. The automatic travel system according to claim 1, wherein
the vehicle is apart from the interference boundary line by a distance determined based on the prohibition boundary line and a rectangle surrounding an outline of the vehicle.

7. An automatic travel method for a vehicle that is movable from a previous travel route to a subsequent travel route via turning travel, the method comprising:
setting a prohibition boundary line beyond which the vehicle is prohibited from entering;
setting a virtual turning circle as a target route for entry turning travel for entering the subsequent travel route;
calculating a tangent to the virtual turning circle from a vehicle body reference point that is calculated during travel;
controlling tangent following travel using an orientation of the tangent as a target orientation;
when an angle between a travel orientation of the vehicle and the tangent is within a predetermined angle in the tangent following travel, controlling the entry turning travel of the vehicle using the tangent as a transition target route;
detecting, as an interference boundary line, the prohibition boundary line that is present in a moving direction of the vehicle in the tangent following travel; and
controlling interference avoidance travel to avoid the vehicle from interfering with the interference boundary line; wherein
the controlling the interference avoidance travel includes setting an interference avoidance route that is a line parallel to the interference boundary line and that is at a position at which the vehicle can travel at a distance from the interference boundary line; and
upon completion of travel of the vehicle in the interference avoidance route, automatic travel control for the vehicle is taken over by the tangent following travel.

* * * * *